(12) United States Patent
Endo

(10) Patent No.: US 9,847,094 B2
(45) Date of Patent: Dec. 19, 2017

(54) VOICE PROCESSING DEVICE, VOICE PROCESSING METHOD, AND NON-TRANSITORY COMPUTER READABLE RECORDING MEDIUM HAVING THEREIN PROGRAM FOR VOICE PROCESSING

(71) Applicant: FUJITSU LIMITED, Kawasaki-shi, Kanagawa (JP)

(72) Inventor: Kaori Endo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 179 days.

(21) Appl. No.: 14/752,548

(22) Filed: Jun. 26, 2015

(65) Prior Publication Data

US 2016/0064012 A1    Mar. 3, 2016

(30) Foreign Application Priority Data

Aug. 27, 2014  (JP) ................................. 2014-173078

(51) Int. Cl.
*G10L 21/00*     (2013.01)
*G10L 21/038*    (2013.01)
(Continued)

(52) U.S. Cl.
CPC .......... *G10L 21/038* (2013.01); *H04M 1/605* (2013.01); *H04R 3/005* (2013.01);
(Continued)

(58) Field of Classification Search
None
See application file for complete search history.

(56) References Cited

U.S. PATENT DOCUMENTS 6,377,680 B1 * 4/2002 Foladare ............... H04M 3/303
                                                          379/391
6,549,630 B1   4/2003 Bobisuthi
(Continued)

FOREIGN PATENT DOCUMENTS

EP         1638084 A1    3/2006
JP       2000-261530 A   9/2000
(Continued)

OTHER PUBLICATIONS

EESR, Extended European Search Report of European Patent Application No. 15174290.5 dated Feb. 12, 2016.

*Primary Examiner* — Kevin Ky
(74) *Attorney, Agent, or Firm* — Maschoff Brennan

(57) ABSTRACT

A voice processing device includes a first sound collecting unit for generating a first voice signal; a human-body vibration obtaining unit for generating a human-body vibration signal; a first distance calculating unit for calculating a ratio in power or amplitude between the human-body vibration signal and the first voice signal and for calculating a first distance from the first sound collecting unit to a sound source in accordance with the ratio and distance estimation information; a second distance calculating unit for calculating, for each of a plurality of frequencies, a second distance from the first sound collecting unit to a sound source which produces a component of a frequency of a first frequency signal; a gain determining unit for determining, for each of the plurality of frequencies, a gain based on a comparison result between the first distance and the second distance.

7 Claims, 8 Drawing Sheets

(51) Int. Cl.
   *H04M 1/60*       (2006.01)
   *H04R 3/00*       (2006.01)

(52) U.S. Cl.
   CPC ..... *H04M 2250/12* (2013.01); *H04R 2460/13* (2013.01); *H04R 2499/11* (2013.01)

(56) References Cited

U.S. PATENT DOCUMENTS

| | | | | |
|---|---|---|---|---|
| 6,931,138 B2* | 8/2005 | Kawamura | ............ | H04R 1/406 348/231.4 |
| 8,620,388 B2* | 12/2013 | Hayakawa | .......... | G10L 21/0208 370/310.2 |
| 8,981,994 B2* | 3/2015 | Sorenson | ............... | G10K 11/34 342/368 |
| 9,031,257 B2* | 5/2015 | Sorensen | ............... | H04R 3/005 381/122 |
| 9,042,573 B2* | 5/2015 | Åhgren et al. | ........ | G01S 3/8006 381/92 |
| 9,042,574 B2* | 5/2015 | Sorensen | ................ | G10L 21/02 381/122 |
| 9,042,575 B2* | 5/2015 | Sorensen | ................ | H04R 3/12 381/122 |
| 9,111,543 B2* | 8/2015 | Åhgren | .................... | G10L 21/02 |
| 9,118,769 B2* | 8/2015 | Wu | ..................... | H04M 1/6058 |
| 9,210,504 B2* | 12/2015 | Sorensen | ............... | H04R 3/005 |
| 9,269,367 B2* | 2/2016 | Strommer | ............... | G10L 21/02 |
| 2006/0104454 A1* | 5/2006 | Guitarte Perez | ........ | G06F 3/011 381/71.6 |
| 2007/0156399 A1* | 7/2007 | Matsuo | ............... | G10L 21/0208 704/233 |
| 2007/0274536 A1* | 11/2007 | Matsuo | .................. | H04R 1/406 381/94.3 |
| 2010/0056227 A1 | 3/2010 | Hayakawa et al. | | |
| 2010/0278352 A1 | 11/2010 | Petit et al. | | |

FOREIGN PATENT DOCUMENTS

| | | |
|---|---|---|
| JP | 2010-54731 | 3/2010 |
| JP | 2010-81495 | 4/2010 |
| WO | 02/098169 A1 | 12/2002 |

* cited by examiner

VOICE PROCESSING DEVICE, VOICE PROCESSING METHOD, AND NON-TRANSITORY COMPUTER READABLE RECORDING MEDIUM HAVING THEREIN PROGRAM FOR VOICE PROCESSING

CROSS-REFERENCE TO RELATED APPLICATION

This application is based upon and claims the benefit of priority of the prior Japanese Patent Application No. 2014-173078, filed on Aug. 27, 2014, the entire contents of which are incorporated herein by reference.

FIELD

The embodiments discussed herein are related to a voice processing device, voice processing method, and a non-transitory computer readable recording medium having therein a program for voice processing.

BACKGROUND

When a user uses a telephone set such as a portable telephone to make conversation in a place in a noisy environment such as a bustling street, conversation voices collected by a microphone included in the telephone set may include surrounding noise. In this case, since the conversation voices include the voice of the user and the surrounding noise, it is difficult to listen to the voice of the user included in the conversation voices. Thus, technologies have been studied in which, based on a plurality of voice signals generated by a plurality of microphones, noise components included in these voice signals are suppressed (for example, refer to Japanese Laid-open Patent Publication No. 2010-54731 and Japanese Laid-open Patent Publication No. 2010-81495).

For example, a noise suppressing device disclosed in Japanese Laid-open Patent Publication No. 2010-54731 performs a noise suppressing process using use environment information in accordance with the use form on respective sound signals converted by a plurality of sound receiving units.

Also, a portable communication terminal disclosed in Japanese Laid-open Patent Publication No. 2010-81495 includes a first microphone and a second microphone, and a DSP included in a control unit operates as a dual microphone noise canceller or a single microphone noise canceller for removing noise components included in an output signal of the first microphone. This operation of the DSP is switched based on the detection result of a proximity sensor which detects an approach to the face of a caller, and is activated as a dual microphone noise canceller when an approach to the face of the caller is detected.

SUMMARY

According to an aspect of the invention, a voice processing device includes a first sound collecting unit configured to collect a voice propagating through space and generate a first voice signal representing the voice; a second sound collecting unit disposed at a position different from the first sound collecting unit and configured to collect a voice propagating through space and generate a second voice signal representing the voice; a human-body vibration obtaining unit configured to obtain vibration propagating through a human body and generate a human-body vibration signal representing the vibration; a storage unit configured to store distance estimation information representing a relation between a ratio in power or amplitude between the human-body vibration signal and the first voice signal and a distance from the first sound collecting unit to a sound source which produces the voice corresponding to the vibration; a first distance calculating unit configured to calculate, for each frame having a predetermined time length, the ratio in power or amplitude between the human-body vibration signal and the first voice signal and calculate a first distance from the first sound collecting unit to the sound source in accordance with the ratio and the distance estimation information; a time frequency converting unit configured to convert, for each frame, the first voice signal and the second voice signal to a first frequency signal and a second frequency signal, respectively, in a frequency domain; a second distance calculating unit configured to calculate, for each frame and for each of a plurality of frequencies, a second distance from the first sound collecting unit to a sound source which produces a component of the frequency of the first frequency signal, based on the first frequency signal and the second frequency signal; a gain determining unit configured to determine, for each frame and for each of the plurality of frequencies, a gain based on a comparison result between the first distance and the second distance; a signal correcting unit configured to correct the first frequency signal by correcting, for each frame, a component of each of the plurality of frequencies of the first frequency signal in accordance with the gain of the corresponding frequency; and a frequency time converting unit configured to convert, for each frame, the corrected first frequency signal to a corrected voice signal in a time domain.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As described in the background, in a place in a noisy environment, in addition to the user's mouth, which is a sound source of the voice of the user to be collected, various sound sources producing noises are present around the microphone of the telephone set. Also, a distance between the user's mouth and the microphone and a distance between a sound source producing noises and the microphone are often varied. Thus, to suppress noise components, the degree of suppression of a voice signal may be set in accordance with a distance from a sound source to the microphone.

However, at the time of conversation, how to hold the telephone set is varied depending on the user. In accordance with the way of holding the telephone set, the distance from the microphone to the user's mouth, which is a sound source as a sound collection target, is fluctuated. Thus, from the use form or the distance between the portable telephone and the face, the distance from the microphone to the sound source as a sound collection target may not be correctly estimated. When the distance from the microphone to the sound source as a sound collection target is not correctly estimated, it is difficult to appropriately set the degree of suppression of a voice signal in accordance with the distance between the microphone and the sound source.

Accordingly, it is desired to provide a voice processing device capable of appropriately setting a gain of a voice signal in accordance with a distance to a sound source as a sound collection target.

Hereinafter, a voice processing device is described with reference to the drawings. This voice processing device calculates a distance from a sound collecting unit to a sound source as a sound collection target in accordance with a ratio between power of a voice signal generated by a sound collecting unit which collects a voice propagating through space and power of a human-body vibration signal generated by a human-body vibration obtaining unit which obtains vibration propagating through a human body. In accordance with the calculated distance from the sound collecting unit to the sound source, the voice processing device determines an upper limit of distance at which the voice signal is not suppressed. The voice processing device sets a gain for each frequency in accordance with the distance from the sound collecting unit to the sound source calculated for each frequency so as to suppress a component from a sound source positioned away from the sound collecting unit farther than the upper limit of the distance among components of each of a plurality of frequencies included in the voice signal. The voice processing device then multiplies the component of each frequency included in the voice signal by its corresponding gain to suppress the component included in the voice signal from the sound source other than the sound source as a sound collection target.

Figure 1:
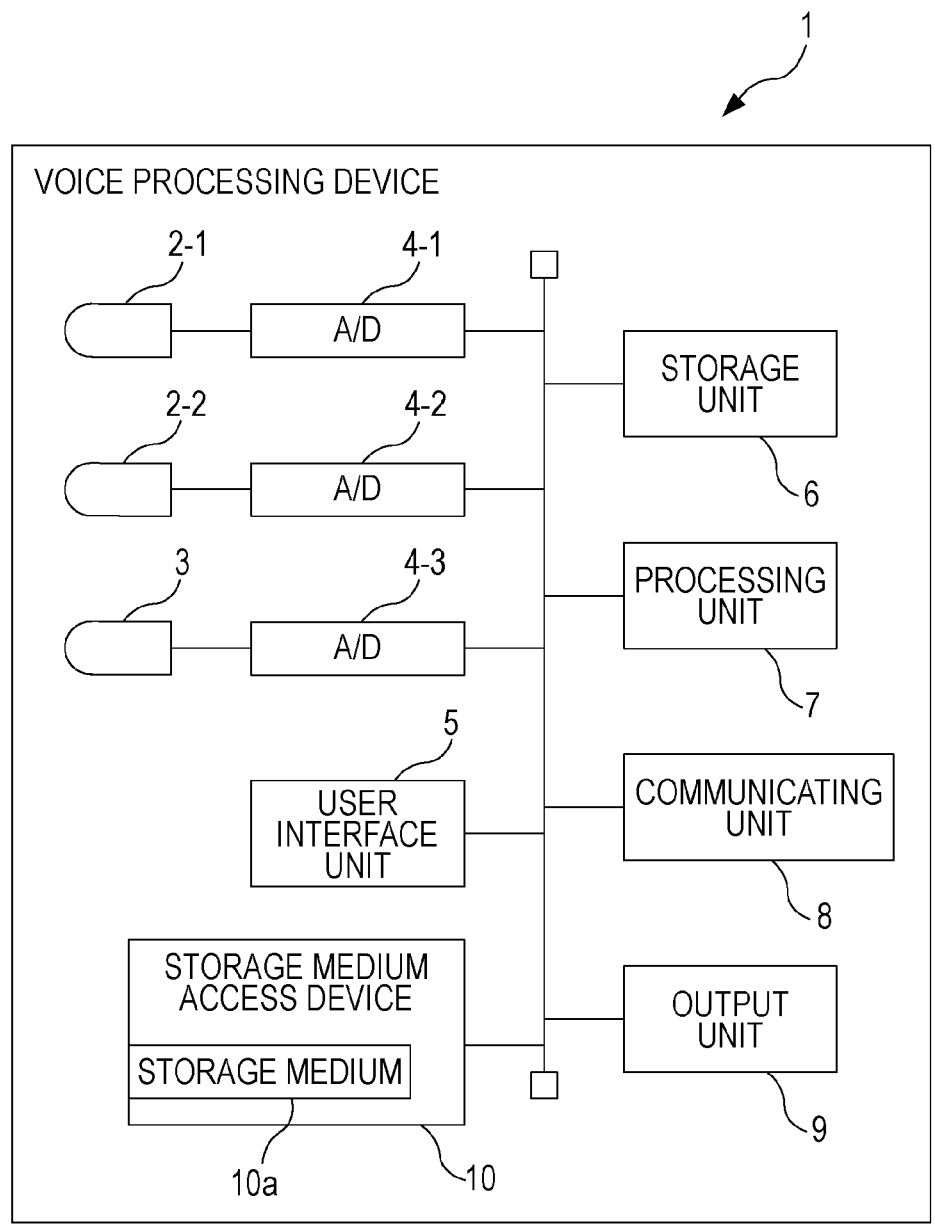
FIG. 1 is a schematic diagram of the structure of a voice processing device according to a first embodiment.

FIG. 1 is a schematic diagram of the structure of a voice processing device according to a first embodiment. In this example, a voice processing device 1 is mounted as a portable telephone. The voice processing device 1 includes sound collecting units 2-1 and 2-2, a human-body vibration obtaining unit 3, analog/digital converting units 4-1 to 4-3, a user interface unit 5, a storage unit 6, a processing unit 7, a communicating unit 8, an output unit 9, and a storage medium access device 10.

The sound collecting units 2-1 and 2-2 each include, for example, a microphone, to collect a voice propagating through space around the sound collecting units 2-1 and 2-2 and generate an analog voice signal with an intensity in accordance with the sound pressure of the voice. The sound collecting unit 2-1 then outputs the generated analog voice signal to the analog/digital converting unit (hereinafter referred to as an A/D converting unit) 4-1. Similarly, the sound collecting unit 2-2 outputs the generated analog voice signal to the A/D converting unit 4-2.

The human-body vibration obtaining unit 3 is disposed at a position directly or indirectly in contact with a human body such as the body of a user to obtain vibration propagating through the human body and generate an analog human-body vibration signal with an intensity in accordance with the intensity of the vibration. This vibration represents vibration occurring at vocal cords and propagating through the human body when the user produces a speech, for example. Therefore, the user's mouth is a sound source which produces a voice in accordance with vibration occurring at the vocal cords and obtained at the human-body vibration obtaining unit 3. The human-body vibration obtaining unit 3 then outputs the human-body vibration signal to the A/D converting unit 4-3. In the present embodiment, the human-body vibration obtaining unit 3 is a bone-conduction microphone. Note that the human-body vibration obtaining unit 3 may be a flesh-conduction microphone or pharynx microphone.

Figure 2:
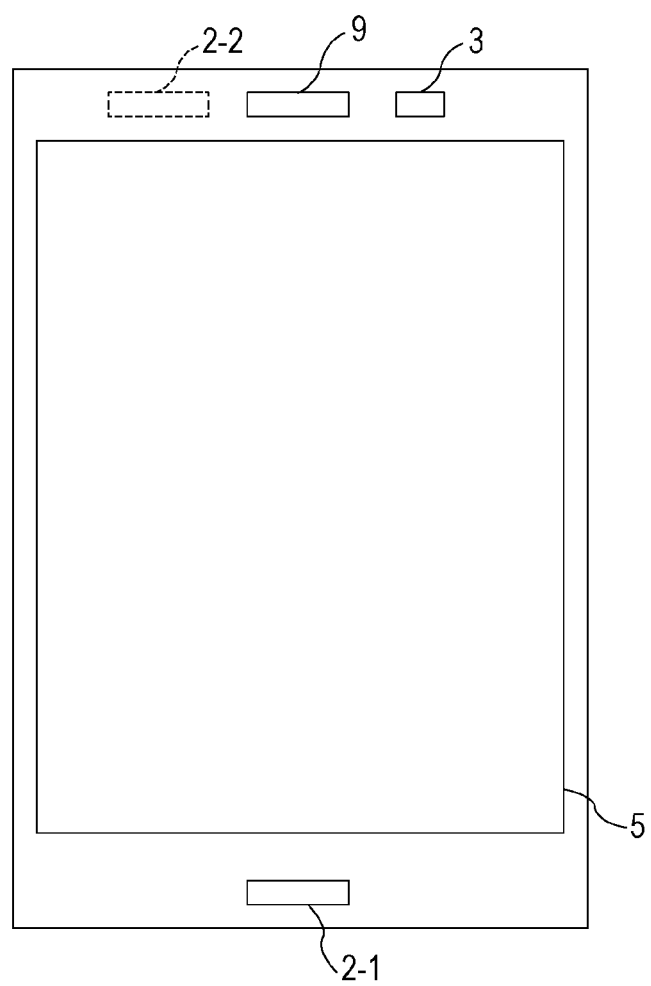
FIG. 2 is a diagram depicting an example of arrangement of sound collecting units and a human-body vibration obtaining unit.

FIG. 2 is a diagram depicting an example of arrangement of the sound collecting units and the human-body vibration obtaining unit. Note that in the following, for convenience, a surface on a side of a housing of the voice processing device 1 where the user interface unit 5 is disposed is referred to as a front surface, and a surface opposite thereto is referred to as a back surface. The sound collecting unit 2-1 and the sound collecting unit 2-2 are disposed, for example, away from each other with a predetermined space (for example, on the order of several cm to 10 cm) so that a voice arrival time is different for each sound collecting unit in accordance with the position of the sound source. In this example, the sound collecting unit 2-1 is a main sound collecting unit for collecting the voice of the user. Thus, the sound collecting unit 2-1 is disposed along a longitudinal direction of the housing of the voice processing device 1 on a front surface side near an end opposite to an end on a side where the output unit 9 which outputs voice is disposed, so as to be positioned closer to the user's mouth than the sound collecting unit 2-2 at the time of conversation. On the other hand, the sound collecting unit 2-2 is disposed along the longitudinal direction of the housing of the voice processing device 1 on a back surface side near the end on the side where the output unit 9 is disposed, in order to generate a voice signal for use in calculating a sound source direction and a distance from the voice processing device 1 to the sound source. Thus, a phase difference between voice signals obtained from the two sound collecting units 2-1 and 2-2 is also changed depending on the sound source direction. Therefore, by examining this phase difference, the voice processing device 1 calculates a sound source direction and a distance to the sound source.

Also, the human-body vibration obtaining unit 3 is desired to be directly or indirectly in contact with the user to obtain vibration propagating through the human body. In general, at the time of conversation in a non-hands-free state, the user brings the output unit 9 closer to the ear so as to easily listen to the voice outputted from the output unit 9. Thus, in this example, the human-body vibration obtaining unit 3 is mounted on the front surface side of the housing of the voice processing device 1 so as to be adjacent to the output unit 9.

With reference to FIG. 1 again, the A/D converting units 4-1 to 4-3 each include, for example, an amplifier and an analog/digital converter. By using the amplifier, the A/D converting unit 4-1 amplifies the analog voice signal received from the sound collecting unit 2-1. The A/D converting unit 4-1 then samples the amplified analog voice signal with a predetermined sampling period (for example, 8 kHz) by using the analog/digital converter, thereby generating a digitalized voice signal. Similarly, the A/D converting unit 4-2 amplifies the analog voice signal received from the sound collecting unit 2-2 and samples the amplified analog voice signal with a predetermined sampling period, thereby generating a digitalized voice signal.

The A/D converting unit 4-3 amplifies the analog human-body vibration signal received from the human-body vibration obtaining unit 3 by using the amplifier. The A/D converting unit 4-3 then samples the amplified human-body vibration signal with a predetermined sampling period by using the analog/digital converter, thereby generating a digitalized human-body vibration signal. Note that, for simplification of processing at the processing unit 7, the sampling period of each A/D converting unit is preferably identical.

Note that, for convenience, the voice signal obtained by digitalizing the analog voice signal generated by the sound collecting unit 2-1 is hereinafter referred to as a first voice signal and the voice signal obtained by digitalizing the analog voice signal generated by the sound collecting unit 2-2 is hereinafter referred to as a second voice signal. Also, the digitalized human-body vibration signal is hereinafter simply referred to a human-body vibration signal. The A/D converting units 4-1 and 4-2 output the first and second voice signals, respectively, to the processing unit 7. Also, the A/D converting unit 4-3 outputs the human-body vibration signal to the processing unit 7.

The user interface unit 5 includes, for example, a touch panel. The user interface unit 5 generates an operation signal in response to an operation by the user, for example, a signal for making an instruction for starting conversation, and outputs the operation signal to the processing unit 7. The user interface unit 5 also causes an icon, image, text, or the like to be displayed in accordance with a signal for display received from the processing unit 7. The user interface unit 5 may separately include a plurality of operation buttons for inputting operation signals and a display device such as a liquid-crystal display.

The storage unit 6 includes, for example, a readable/writable semiconductor memory and a read-only semiconductor memory. The storage unit 6 stores various computer programs and various data for use in the voice processing device 1.

The storage unit 6 also stores various information for use in voice processing. For example, the storage unit 6 stores distance estimation information representing a relation between a ratio of power between the first voice signal and the human-body vibration signal and a distance from the voice processing device 1 to the sound source of a target sound as a sound collection target. Note that details of the distance estimation information will be described further below.

The storage medium access device 10 is, for example, a device which accesses a storage medium 10a such as a semiconductor memory card. For example, the storage medium access device 10 reads a computer program stored in the storage medium 10a and to be executed on the processing unit 7, and passes the read computer program to the processing unit 7.

The processing unit 7 includes one or a plurality of processors, a memory circuit, and a peripheral circuit. The processing unit 7 controls the entire voice processing device 1.

With an operation of the user via the user interface unit 5 included in the voice processing device 1, for example, when a conversation is started, the processing unit 7 performs a calling control process, such as calling, responding, or disconnection.

The processing unit 7 also corrects the first voice signal so as to suppress noise other than the target sound as a sound collection target included in the first and second voice signals, thereby making the target sound easily listened to. The processing unit 7 then performs high-efficiency coding and further performs channel coding on the corrected voice signal, and then outputs the coded voice signal via the communicating unit 8. The processing unit 7 also decodes a coded voice signal received from another device via the communicating unit 8, and outputs the decoded voice signal to the output unit 9.

In the present embodiment, the target sound is the voice of the user using the voice processing device 1 for conversation, and the sound source of the target sound as a sound collection target is the user's mouth.

Note that details of voice processing by the processing unit 7 will be described further below.

The communicating unit 8 transmits the corrected and coded first voice signal to another device. For this process, the communicating unit 8 includes, for example, a baseband processing unit (not depicted), a wireless processing unit (not depicted), and an antenna (not depicted). The baseband processing unit of the communicating unit 8 generates an uplink signal by modulating the voice signal coded by the processing unit 7 by following a modulation scheme conforming to wireless communication standards the communicating unit 8 conforms to. The wireless processing unit of the communicating unit 8 superposes the uplink signal on a carrier wave with radio frequency. The uplink signal is then transmitted to another device via the antenna. The wireless processing unit of the communicating unit 8 also receives a downlink signal including a voice signal from another device via the antenna, converts the downlink signal to a signal with a baseband frequency, and outputs the resultant signal to the baseband processing unit. The baseband processing unit demodulates the signal received from the wireless processing unit, extracts various signals such as the voice signal included therein, or information, and passes the extracted signal or information to the processing unit 7.

The output unit 9 includes, for example, a digital/analog converter for converting the voice signal received from the processing unit 7 to analog and a loudspeaker, and reproduces the voice signal received from the processing unit 7 as a sound wave.

The details of voice processing by the processing unit 7 are described below.

Figure 3:
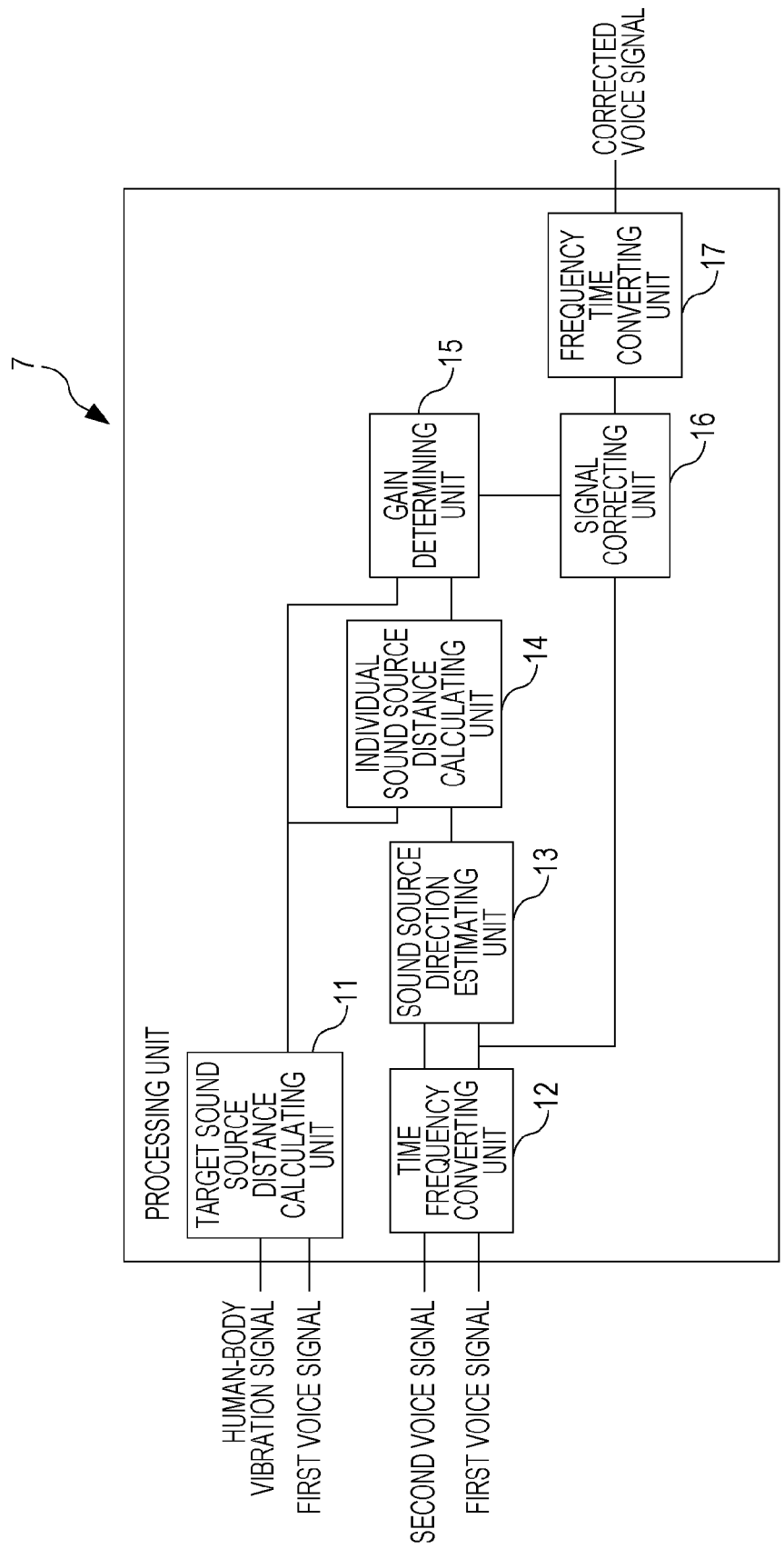
FIG. 3 is a schematic diagram of the structure of a processing unit.

FIG. 3 is a schematic diagram of the structure of the processing unit 7. The processing unit 7 includes a target sound source distance calculating unit 11, a time frequency converting unit 12, a sound source direction estimating unit 13, an individual sound source distance calculating unit 14, a gain determining unit 15, a signal correcting unit 16, and a frequency time converting unit 17.

Each unit included in the processing unit 7 is mounted, for example, as a functional module achieved by a computer program executed on a processor included in the processing unit 7. Alternatively, each unit included in the processing unit 7 may be mounted on the voice processing device 1 as one integrated circuit achieving the function of each unit separately from the processor included in the processing unit 7.

The target sound source distance calculating unit 11 is an example of a first distance calculating unit, and calculates a distance between the user's mouth, which is a sound source of the target sound as a sound collection target, and the sound collecting unit 2-1 based on a ratio in power or amplitude between the first voice signal and the human-body vibration signal.

Since the sound collecting unit 2-1 generates a voice signal in accordance with the voice propagating through space, as the distance between the user's mouth and the sound collecting unit 2-1 is increased, the power and amplitude of the first voice signal are decreased. On the other hand, since the human-body vibration obtaining unit 3 generates a human-body vibration signal in accordance with vibration propagating from the vocal cords via the human body, the power and amplitude of the human-body vibration signal do not depend on the distance between the user's mouth and the sound collecting unit 2-1. Therefore, in accordance with the distance between the user's mouth and the sound collecting unit 2-1, the ratios in power and amplitude between the first voice signal and the human-body vibration signal are changed.

Figure 4:
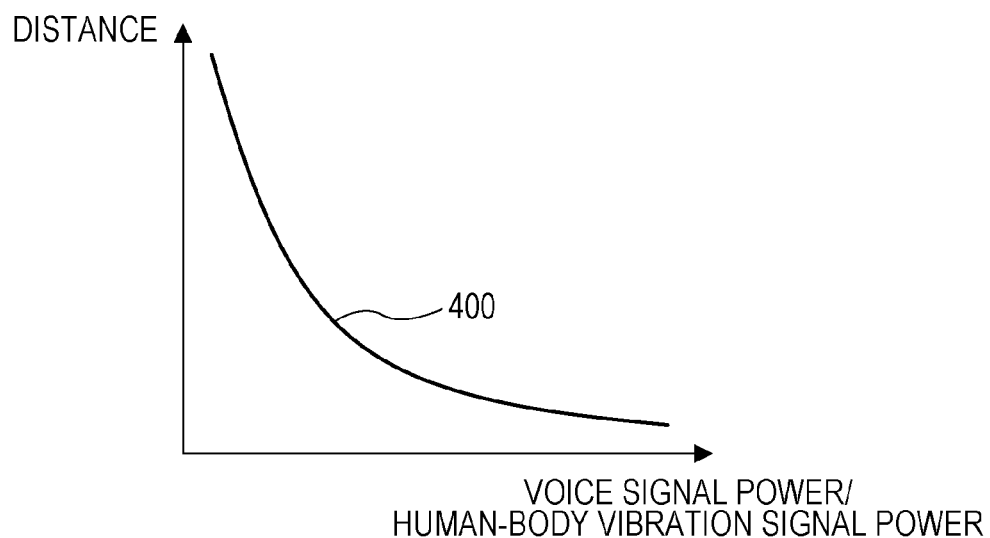
FIG. 4 is a diagram depicting a relation between a ratio of power of a first voice signal to power of a human-body vibration signal and a distance between the user's mouth and a sound collecting unit.

FIG. 4 is a diagram depicting a relation between the ratio of the power of the first voice signal to the power of the human-body vibration signal and the distance between the user's mouth and the sound collecting unit 2-1. In FIG. 4, the horizontal axis represents the ratio of the power of the first voice signal to the power of the human-body vibration signal. On the other hand, the vertical axis represents the distance between the user's mouth and the sound collecting unit 2-1. A graph 400 represents the relation between the ratio of the power of the first voice signal to the power of the human-body vibration signal and the distance between the user's mouth and the sound collecting unit 2-1. As depicted in the graph 400, as the ratio of the power of the first voice signal to the power of the human-body vibration signal is increased, the distance between the user's mouth and the sound collecting unit 2-1 is shortened. Similarly, as the ratio of the amplitude of the first voice signal to the amplitude of the human-body vibration signal is increased, the distance between the user's mouth and the sound collecting unit 2-1 is shortened.

Thus, for example, for each distance between the user's mouth and the sound collecting unit 2-1, the ratio of the power of the first voice signal to the power of the human-body vibration signal is measured in advance. Then, in accordance with the measurement results, distance estimation information is generated which represents the relation between the ratio of the power of the first voice signal to the power of the human-body vibration signal and the distance between the user's mouth and the sound collecting unit 2-1. For example, by applying a least squares method to the measurement results, a distance estimation function is found as distance estimation information, the distance estimation function representing the relation between the ratio of the power of the first voice signal to the power of the human-body vibration signal and the distance between the user's mouth and the sound collecting unit 2-1. Alternatively, based on the measurement results, a reference table may be generated as distance estimation information, the reference table having stored therein the ratio of the power of the first voice signal to the power of the human-body vibration signal for each distance between the user's mouth and the sound collecting unit 2-1. Note that a distance estimation function or reference table may be generated as distance estimation information, representing the relation between the ratio of the amplitude of the first voice signal to the amplitude of the human-body vibration signal and the distance between the user's mouth and the sound collecting unit 2-1. Still alternatively, a distance estimation function or reference table may be generated as distance estimation information, representing the relation between the ratio of the power or amplitude of the human-body vibration signal to the first voice signal and the distance between the user's mouth and the sound collecting unit 2-1. In this case, conversely, as the ratio of the power or amplitude of the human-body vibration signal to the first voice signal is increased, the distance between the user's mouth and the sound collecting unit 2-1 is increased. The distance estimation information is then stored in advance in the storage unit 6.

The target sound source distance calculating unit 11 divides each of the first voice signal and the human-body vibration signal in units of frames each having a predetermined time length (for example, several tens of msec) at the time of performing voice processing. The target sound source distance calculating unit 11 then calculates, for each frame, a power $P1(t)$ of the first voice signal ($=10 \log_{10}(\Sigma x(t)^2)$, where $x(t)$ is the first voice signal at each sampling point included in a t-th frame). Furthermore, the target sound source distance calculating unit 11 calculates, for each frame, a power $B(t)$ of the human-body vibration signal ($=10 \log_{10}(\Sigma y(t)^2)$, where $y(t)$ is the human-body vibration signal at each sampling point included in a t-th frame). When the power $B(t)$ of the human-body vibration signal is equal to or larger than a lower-limit value (for example, 3 dB) of power allowing distance estimation, the target sound source distance calculating unit 11 calculates a ratio ($P1(t)/B(t)$) of the power $P1(t)$ of the first voice signal to the power $B(t)$ of the human-body vibration signal. With reference to the distance estimation information stored in the storage unit 6, the target sound source distance calculating unit 11 specifies the distance between the user's mouth and the sound collecting unit 2-1 corresponding to the power ratio ($P1(t)/B(t)$). The target sound source distance calculating unit 11 then sets the specified distance as an estimated value LP of the distance between the user's mouth and the sound collecting unit 2-1. On the other hand, when the power $B(t)$ of the human-body vibration signal is smaller than the lower-limit value of the power allowing distance estimation, the target sound source distance calculating unit 11 does not calculate the distance between the user's mouth and the sound collecting unit 2-1.

Note that when the distance estimation information represents the relation between the ratio of the amplitude of the first voice signal to the amplitude of the human-body vibration signal and the distance between the user's mouth and the sound collecting unit 2-1, the target sound source distance calculating unit 11 finds, for each frame, a sum of absolute values of the amplitudes of the first voice signal and the human-body vibration signal. Then, with reference to the distance estimation information, the target sound source distance calculating unit 11 finds the distance between the user's mouth and the sound collecting unit 2-1 corresponding to a ratio of the sum of the absolute values of the amplitudes of the first voice signal to the sum of the absolute values of the amplitudes of the human-body vibration signal.

The target sound source distance calculating unit 11 outputs, for each frame, the distance between the user's mouth and the sound collecting unit 2-1 to the gain determining unit 15.

The time frequency converting unit 12 divides the first voice signal into units of frames each having a predetermined time length (for example, several tens of msec) and performs time frequency conversion for each frame, thereby calculating a first frequency signal, which is a frequency-domain signal. Similarly, the time frequency converting unit 12 divides the second voice signal into units of frames and performs time frequency conversion for each frame, thereby calculating a second frequency signal, which is a frequency-domain signal. As time frequency conversion, for example, the time frequency converting unit 12 may use fast Fourier transform (FFT) or modified discrete cosine transform (MDCT). The first and second frequency signals each include, for example, components of frequencies half the total number of sampling points included in a frame.

For each frame, the time frequency converting unit 12 outputs the first frequency signal to the sound source direction estimating unit 13, the individual sound source distance calculating unit 14, and the signal correcting unit 16, and outputs the second frequency signal to the sound source direction estimating unit 13 and the individual sound source distance calculating unit 14.

For each frame, the sound source direction estimating unit 13 estimates, for each of a plurality of frequencies, a direction of the sound source producing components of that frequency included in the first and second frequency signals. In the present embodiment, the sound source direction estimating unit 13 estimates a direction of the sound source based on a phase difference between the first frequency signal and the second frequency signal for each frequency. For example, the sound source direction estimating unit 13 finds a phase difference $\Delta\phi(f)$ for each frequency in accordance with the following equation (1).

$$\Delta\phi(f) = \tan^{-1}\left(\frac{S_1(f)}{S_2(f)}\right) \quad 0 < f < fs/2 \qquad (1)$$

Here, $S_1(f)$ represents a component at a frequency f in the first frequency signal, and $S_2(f)$ represents a component at the frequency f in the second frequency signal. Also, fs represents a sampling frequency of the A/D converting units 4-1 and 4-2. In this case, a difference $\Delta T(f)$ in voice arrival time between the sound collecting unit 2-1 and the sound collecting unit 2-2 for the component of the frequency f is represented by the following equation (2).

$$\Delta T(f) = \frac{\Delta\phi(f)}{2\pi f} \qquad (2)$$

Therefore, an estimated direction $\theta(f)$ of the sound source for the component of the frequency f at the midpoint of a line connecting the sound collecting unit 2-1 and the sound collecting unit 2-2 when the direction of the normal of that line is taken as 0 is represented by the following equation (3).

$$\theta(f) = \sin^{-1}(\Delta T(f)/\Delta T_{max})$$

$$\Delta T_{max} = d/V_s \qquad (3)$$

Here, d is a distance between the sound collecting unit 2-1 and the sound collecting unit 2-2, and $V_s$ is a velocity of sound.

For each frame, the sound source direction estimating unit 13 outputs the estimated direction $\theta(f)$ of the sound source for each frequency to the individual sound source distance calculating unit 14 and the gain determining unit 15.

The individual sound source distance calculating unit 14 is an example of a second distance calculating unit, and calculates, for each frame and for each plurality of frequencies, a distance between the sound source and the sound collecting unit 2-1 for the component of that frequency included in the first frequency signal.

In the present embodiment, the individual sound source distance calculating unit 14 calculates a distance in accordance with the following equations (4-1) and (4-2) based on the estimated direction $\theta(f)$ of the sound source for each frequency and a difference between the power of the first frequency signal and the power of the second frequency signal.

When $\theta(f) \leq -Th\theta$ or $Th\theta \leq \theta(f)$, $$R(f) = L \qquad (4\text{-}1)$$

When $-Th\theta < \theta(f) < Th\theta$, $$R(f) = \begin{cases} L & Th3 < Pdiff(f) \\ L + \Delta L & Pdiff(f) \leq Th2 \\ L + \Delta L(Th3 - Pdiff(f))/(Th3 - Th2) & Th2 < Pdiff(f) < Th3 \end{cases} \qquad (4\text{-}2)$$

Here, R(f) is an estimated distance from the sound collecting unit 2-1 to the sound source for the component of the frequency f included in the first and second frequency signals. Pdiff(f) is a difference ($P1(f)$-$P2(f)$) between the power $P1(f)$ of the component of the frequency f of the first frequency signal and the power $P2(f)$ of the component of the frequency f of the second frequency signal. $Th\theta$ is a minimum angle with respect to the normal to the line connecting the two sound collecting units 2-1 and 2-2, the minimum angle at which the difference between the distance from the sound source to the sound collecting unit 2-1 and the distance from the sound source to the sound collecting unit 2-2 is too small to calculate a distance to the sound source based on the power difference between the first frequency signal and the second frequency signal. For example, $Th\theta$ is set at 0.3 radians. Also, L is a maximum value of the estimated distance from the sound collecting unit 2-1 to the user's mouth, for example, 20 cm. Furthermore, $\Delta L$ is a difference obtained by subtracting a distance at which the gain is minimum from an upper-limit value of the distance at which the gain is 1, and is set at, for example, 5 cm. Still further, Th2 is an upper-limit value of the power difference at which the distance from the sound collecting unit 2-1 to the sound source is estimated to be away enough to be able to ignore a difference between the distance from the sound collecting unit 2-1 to the sound source and the distance from the sound collecting unit 2-2 to the sound source, and is set at, for example, 3 dB. On the other hand, Th3 is a lower-limit value of a power difference at which the distance from the sound collecting unit 2-1 to the sound source is estimated to be shorter than the distance from the sound collecting unit 2-2 to the sound source, and is set at, for example, 6 dB.

Figure 5:
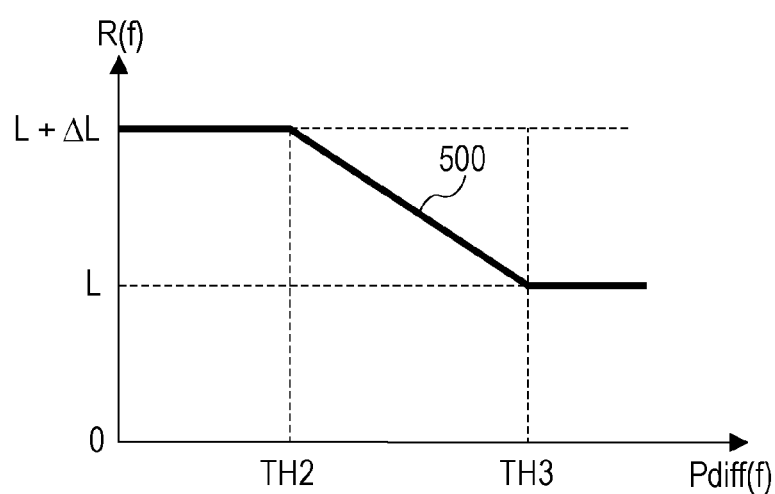
FIG. 5 is a diagram depicting an example of a relation between a power difference between a first frequency signal and a second frequency signal and an estimated value of the distance from the sound collecting unit to the user's mouth.

FIG. 5 is a diagram depicting an example of a relation between the power difference between the first frequency signal and the second frequency signal and the estimated value R(f) of the distance from the sound collecting unit 2-1 to the user's mouth. In FIG. 5, the horizontal axis represents the power difference Pdiff(f) between the first frequency signal and the second frequency signal, and the vertical axis represents the estimated value R(f) of the distance. A graph 500 represents the relation between the power difference Pdiff(f) between the first frequency signal and the second frequency signal and the estimated value R(f) of the distance.

As represented by equations (4-1) and (4-2) and FIG. 5, when the power difference Pdiff(f) between the first frequency signal and the second frequency signal is smaller than Th2, the estimated value R(f) of the distance between the sound collecting unit 2-1 and the user's mouth is set at (L+ΔL). On the other hand, when the power difference Pdiff(f) is equal to or larger than Th3, the estimated value R(f) of the distance is set at L. When the power difference Pdiff(f) is equal to or larger than Th2 and smaller than Th3, the estimated value R(f) of the distance is decreased as the power difference Pdiff(f) is increased.

The individual sound source distance calculating unit 14 outputs, for each frame, the estimated value R(f) of the distance between the user's mouth and the sound collecting unit 2-1 for each frequency to the gain determining unit 15.

The gain determining unit 15 determines, for each frame and for each of a plurality of frequencies, a gain for the component of that frequency of the first frequency signal based on the estimated value θ(f) of the sound source direction and the estimated value R(f) of the distance. In the present embodiment, a gain G(f) for the frequency f is any value in a range of 0 to 1. As the gain G(f) is decreased, the component of the corresponding frequency is suppressed. On the other hand, when the gain G(f) is 1, the component of the corresponding frequency is not suppressed.

Also, in the present embodiment, when the estimated value of the distance from the sound collecting unit 2-1 to the user's mouth has been found, the gain determining unit 15 sets the estimated value LP of the distance at an upper-limit value LE of the distance from the sound collecting unit 2-1 to the sound source, the distance at which the component of each frequency included in the first frequency signal is not suppressed. That is, when the estimated value R(f) of the distance between the sound collecting unit 2-1 and the sound source at the frequency f is larger than the estimated value LP of the distance between the sound collecting unit 2-1 and the user's mouth, the gain determining unit 15 determines the gain G(f) so that the gain G(f) is smaller than that when the estimated distance R(f) is equal to or smaller than the estimated value LP of the distance. With this, the gain determining unit 15 determines the gain G(f) so that the component corresponding to noise from another sound source farther away from the sound collecting unit 2-1 than the user's mouth is suppressed, while suppression of the component corresponding to the sound produced from the user's mouth, which is a sound source as a sound collection target, is reduced.

Note that an error may be present in the estimated value LP of the distance from the sound collecting unit 2-1 to the user's mouth, and an actual distance from the sound collecting unit 2-1 to the user's mouth may be longer than the estimated value LP of the distance. In this case, to reduce suppression of components corresponding to the sound produced from the user's mouth, the upper-limit value LE of the distance from the sound collecting unit 2-1 to the sound source, the distance at which the component of each frequency included in the first frequency signal is not suppressed, may be set at a value obtained by adding a predetermined margin (for example, 1 cm to several cm) to the estimated value LP of the distance.

The gain determining unit 15 determines the gain G(f) with respect to the component of the frequency f in accordance with the following equation (5), for example.

$$G(f) = \min(G\theta, GL) \quad (5)$$

$$G\theta = \begin{cases} 0 & \theta(f) \leq PL - \Delta\theta \text{ or } PH + \Delta\theta \leq \theta(f) \\ (PL - \theta(f))/\Delta\theta & PL - \Delta\theta < \theta(f) \leq PL \\ 1 & PL < \theta(f) < PH \\ 1 - (\theta(f) - PH)/\Delta\theta & PH \leq \theta(f) < PH + \Delta\theta \end{cases}$$

$$GL = \begin{cases} 0 & LE + \Delta L \leq R(f) \\ 1 - (R(f) - LE)/\Delta L & LE < R(f) < LE + \Delta L \\ 1 & R(f) \leq LE \end{cases}$$

Here, Gθ is a gain defined based on the sound source direction, and GL is a gain defined based on the distance between the sound collecting unit 2-1 and the and the sound source. PL and PH are a lower-limit value and an upper-limit value, respectively, of the sound source direction in which the user's mouth is assumed to be present, and are set in accordance with the arrangement of the sound collecting unit 2-1 and the sound collecting unit 2-2. For example, when the direction of the normal to the line connecting the sound collecting unit 2-1 and the sound collecting unit 2-2 is taken as 0 and a direction from the direction of the normal toward a sound collecting unit 2-1 side is taken as positive, PL=0 and PH=π. Also, Δθ is an offset, and is set at, for example, 0.1 radians to 0.3 radians. Furthermore, LE is the upper-limit value of the distance at which the frequency component is not suppressed and, as described above, is set at the distance from the sound collecting unit 2-1 to the user's mouth calculated by the target sound source distance calculating unit 11. As described regarding equations (4-1) and (4-2), ΔL is the difference obtained by subtracting the distance at which the gain is minimum from the upper-limit value of the distance at which the gain is 1, and is set at, for example, 5 cm. A function min(x,y) is a function for outputting a minimum value of variables x and y. Note that, according to a modification example, the gain G(f) may be calculated as the product of the gain Gθ and the gain GL.

Figure 6:
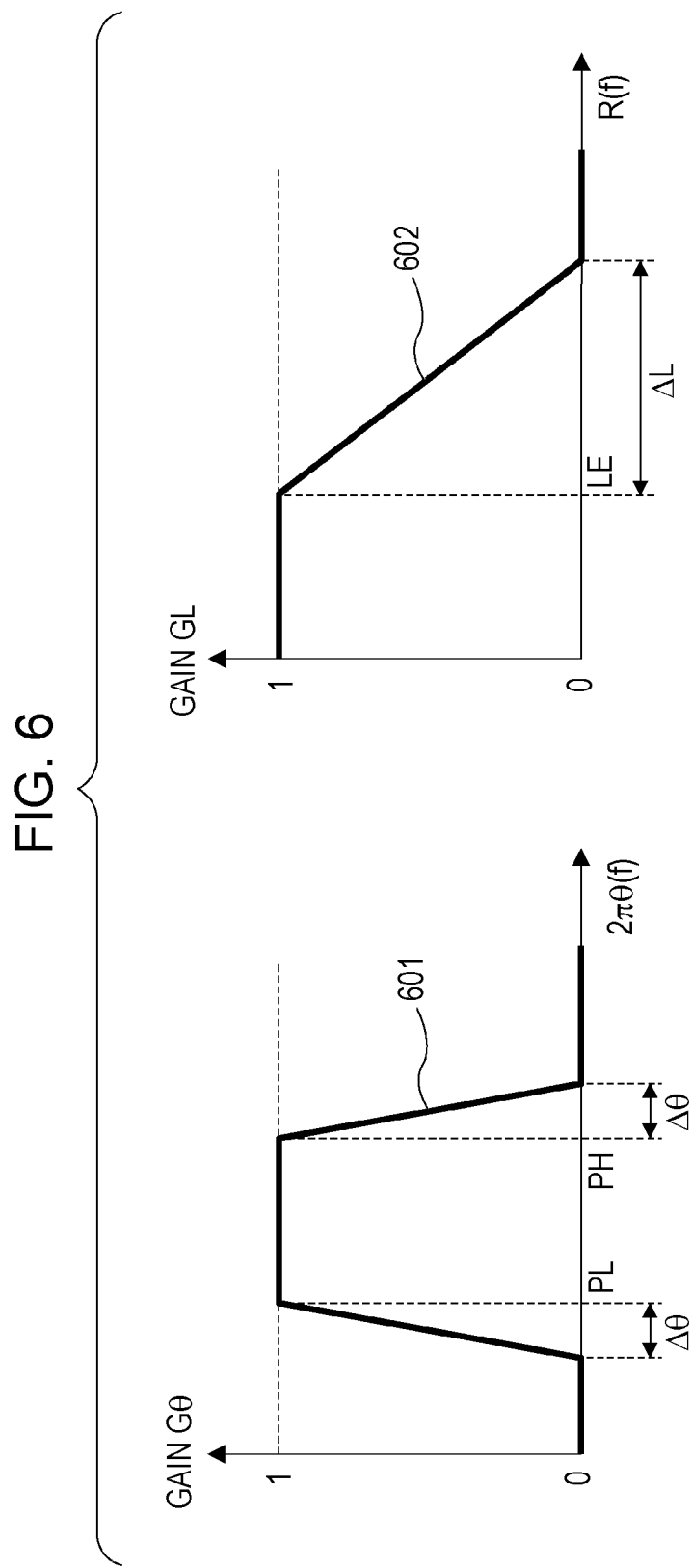
FIG. 6 is a diagram depicting an example of a relation between a sound source direction and a distance to a sound source and gains.

FIG. 6 is a diagram depicting an example of a relation between the sound source direction θ(f) and the distance R(f) to the sound source and gains. On a left side of FIG. 6, a relation between the sound source direction θ(f) and the gain Gθ is depicted. In this relation diagram, the horizontal axis represents the sound source direction θ(f) and the vertical axis represents the gain Gθ. A graph 601 depicts the relation between the sound source direction θ(f) and the gain Gθ. On the other hand, on a right side of FIG. 6, a relation between the distance R(f) from the sound collecting unit 2-1 to the sound source and the gain GL is depicted. In this relation diagram, the horizontal axis represents the distance R(f) and the vertical axis represents the gain GL. A graph 602 depicts the relation between the distance R(f) and the gain GL.

As represented by FIG. 6 and equation (5), the gain Gθ is decreased as the estimated sound source direction θ(f) for the component of the frequency f in the first frequency signal falls more out of a range of the sound source direction in which the user's mouth is estimated to be present. Also, the gain GL is decreased as the distance R(f) from the sound collecting unit 2-1 to the sound source calculated for the component of the frequency f in the first frequency signal is farther away from the estimated value LP of the distance from the sound collecting unit 2-1 to the user's mouth. And, the gain G(f) takes a value which is a smaller one of Gθ and GL.

The gain determining unit 15 passes, for each frame, the gain G(f) of each frequency to the signal correcting unit 16.

The signal correcting unit 16 corrects, for each frame, the component of each frequency of the first frequency signal in accordance with the gain G(f) and in accordance with, for example, the following equation (6).

$$RE(CS_1(f))=G(f) \cdot RE(S_1(f))$$

$$IM(CS_1(f))=G(f) \cdot IM(S_1(f)) \quad (6)$$

Here, $S_1(f)$ represents a component of the frequency f in the first frequency signal, and $CS_1(f)$ represents a component of the frequency f in the corrected first frequency signal. Also, RE(X) represents a real part of a variable X, and IM(X) represents an imaginary part of the variable X. As evident from equation (6), as the gain G(f) is decreased, $CS_1(f)$ is decreased. Therefore, the first frequency signal is attenuated more as the estimated sound source direction θ(f) falls more out of the range of the sound source direction in which the user's mouth is estimated to be present. Furthermore, the first frequency signal is attenuated more as the distance R(f) from the sound collecting unit 2-1 to the sound source is farther away from the estimated value LP of the distance from the sound collecting unit 2-1 to the user's mouth.

The signal correcting unit 16 passes, for each frame, the corrected first frequency signal to the frequency time converting unit 17.

The frequency time converting unit 17 converts, for each frame, the corrected first frequency signal to a time-domain signal by using inverse conversion of the time frequency conversion used by the time frequency converting unit 12, thereby obtaining the corrected voice signal.

With this, noise other than the voice produced from the user's mouth is attenuated, and therefore the corrected first voice signal is a voice signal in which the user's voice is made easily listened to.

Figure 7:
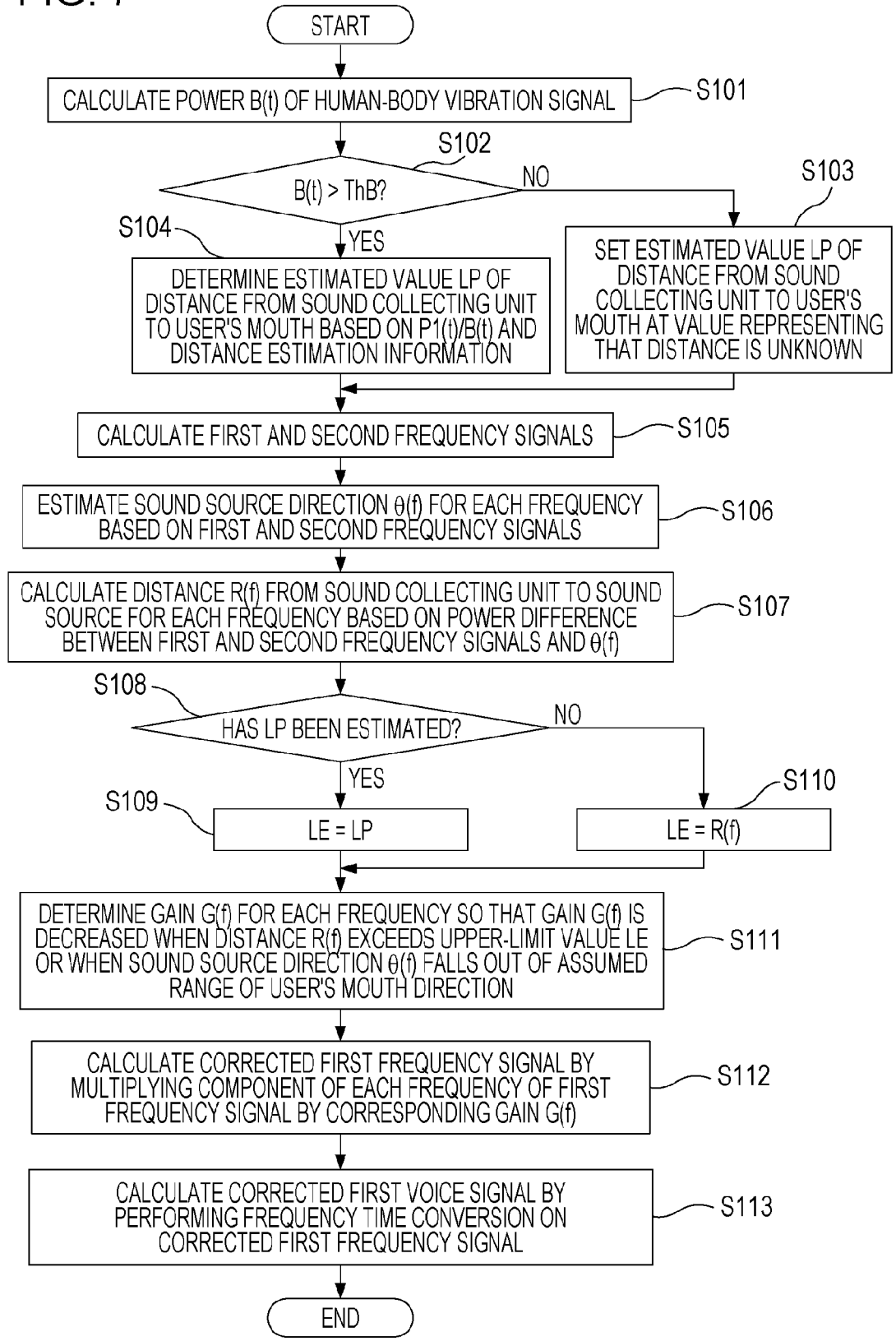
FIG. 7 is an operation flowchart of voice processing.

FIG. 7 is an operation flowchart of voice processing to be performed by the processing unit 7. The processing unit 7 performs the following process for each frame.

The target sound source distance calculating unit 11 calculates the power B(t) of the human-body vibration signal obtained from the human-body vibration obtaining unit 3 (step S101). The target sound source distance calculating unit 11 then determines whether the power B(t) of the human-body vibration signal is larger than a predetermined threshold ThB (step S102). When the power B(t) of the human-body vibration signal is equal to or smaller than the predetermined threshold ThB (No in step S102), the target sound source distance calculating unit 11 sets the estimated value LP of the distance between the sound collecting unit 2-1 and the user's mouth at a value representing that the distance is unknown (for example, a negative value) (step S103).

On the other hand, when the power B(t) of the human-body vibration signal is larger than the predetermined threshold ThB (Yes in step S102), the target sound source distance calculating unit 11 is able to calculate the distance from the sound collecting unit 2-1 to the user's mouth in accordance with the power B(t) and the power P1(t) of the first voice signal obtained from the sound collecting unit 2-1. Thus, the target sound source distance calculating unit 11 calculates the estimated value LP of the distance from the sound collecting unit 2-1 to the user's mouth based on the ratio of the power P1(t) to the power B(t) (P1(t)/B(t)) and distance estimation information (step S104). After step S103 or S104, the target sound source distance calculating unit 11 outputs the estimated value LP of the distance to the gain determining unit 15.

The time frequency converting unit 12 performs time-frequency conversion on the first and second voice signals to calculate first and second frequency signals in a frequency domain (step S105). The time frequency converting unit 12 then outputs the first frequency signal to the sound source direction estimating unit 13, the individual sound source distance calculating unit 14, and the signal correcting unit 16, and outputs the second frequency signal to the sound source direction estimating unit 13 and the individual sound source distance calculating unit 14.

The sound source direction estimating unit 13 estimates the sound source direction θ(f) for each of the plurality of frequencies, based on the first and second frequency signals (step S106). The sound source direction estimating unit 13 then outputs the estimated sound source direction θ(f) of each frequency to the individual sound source distance calculating unit 14 and the gain determining unit 15.

The individual sound source distance calculating unit 14 finds the estimated value R(f) of the distance from the sound collecting unit 2-1 to the sound source for each of the plurality of frequencies, based on the power difference of frequency components between the first frequency signal and the second frequency signal and the estimated sound source direction θ(f) (step S107). The individual sound source distance calculating unit 14 then outputs the estimated distance R(f) of each frequency to the gain determining unit 15.

The gain determining unit 15 determines whether the estimated value LP of the distance has been calculated (step S108). When the estimated value LP of the distance has been calculated (Yes in step S108), the gain determining unit 15 sets the upper-limit value LE of a distance in which the frequency component included in the first frequency signal is not attenuated at the estimated value LP of the distance (step S109). On the other hand, when the estimated value LP of the distance has not been calculated (No in step S108), the gain determining unit 15 sets, for each frequency, the upper-limit value LE at the distance R(f) calculated based on the first frequency signal and the second frequency signal (step S110). Alternatively, the gain determining unit 15 may set the upper-limit value LE at an assumed maximum distance L from the sound collecting unit 2-1 to the user's mouth. In this case, as evident from equation (5), a frequency component from a sound source farther away from the sound collecting unit 2-1 than the assumed maximum distance L is suppressed.

After step S109 or S110, the gain determining unit 15 calculates, for each frequency, the gain G(f) so that a frequency component is attenuated when the distance R(f) exceeds the upper-limit value LE or when the sound source direction θ(f) falls out of an assumed range of the user's mouth direction (step S111). The gain determining unit 15 then outputs the gain G(f) for each frequency to the signal correcting unit 16.

The signal correcting unit 16 corrects the first frequency signal for each frequency by multiplying the first frequency signal by the gain G(f) of that frequency (step S112). The signal correcting unit 16 then outputs the corrected first frequency signal to the frequency time converting unit 17.

The frequency time converting unit 17 calculates a corrected first voice signal in a time domain by performing frequency time conversion on the corrected first frequency signal (step S113). The frequency time converting unit 17 then outputs the corrected voice signal, and then the voice processing ends.

Note that the sequence of the processes in steps S101 to S104 and the sequence of the processes in steps S105 to S107 may be transposed.

As has been described above, the voice processing device accurately estimates the distance from the sound collecting unit to the user's mouth, which is a sound source as a sound collection target, based on the ratio between the power of the human-body vibration signal and the power of the first voice signal. Thus, the voice processing device appropriately sets a gain for the component of each frequency included in the first frequency signal in accordance with the estimated distance from the sound collecting unit to the sound source for that frequency. As a result, even when the user holds the voice processing device in any manner, the voice processing device appropriately suppresses noise components included in the voice signal other than the voice of the user.

Note that the pressure with which the human body is pressed onto the voice processing device is varied depending on the user. In accordance with the pressure, the relation between the ratio between the power of the human-body vibration signal and the power of the first voice signal and the distance from the sound collecting unit to the user's mouth is also varied.

Thus, according to a second embodiment, a voice processing device has stored therein, for each pressure value of the pressure of the human body onto the voice processing device, distance estimation information representing the relation between the ratio between the power of the human-body vibration signal and the power of the first voice signal and the distance from the sound collecting unit to the user's mouth found in advance. At the time of conversation, by using a pressure sensor, the voice processing device detects the pressure of the human body onto the voice processing device and selects the distance estimation information in accordance with the detected pressure, thereby calculating the distance from the sound collecting unit to the user's mouth.

Figure 8:
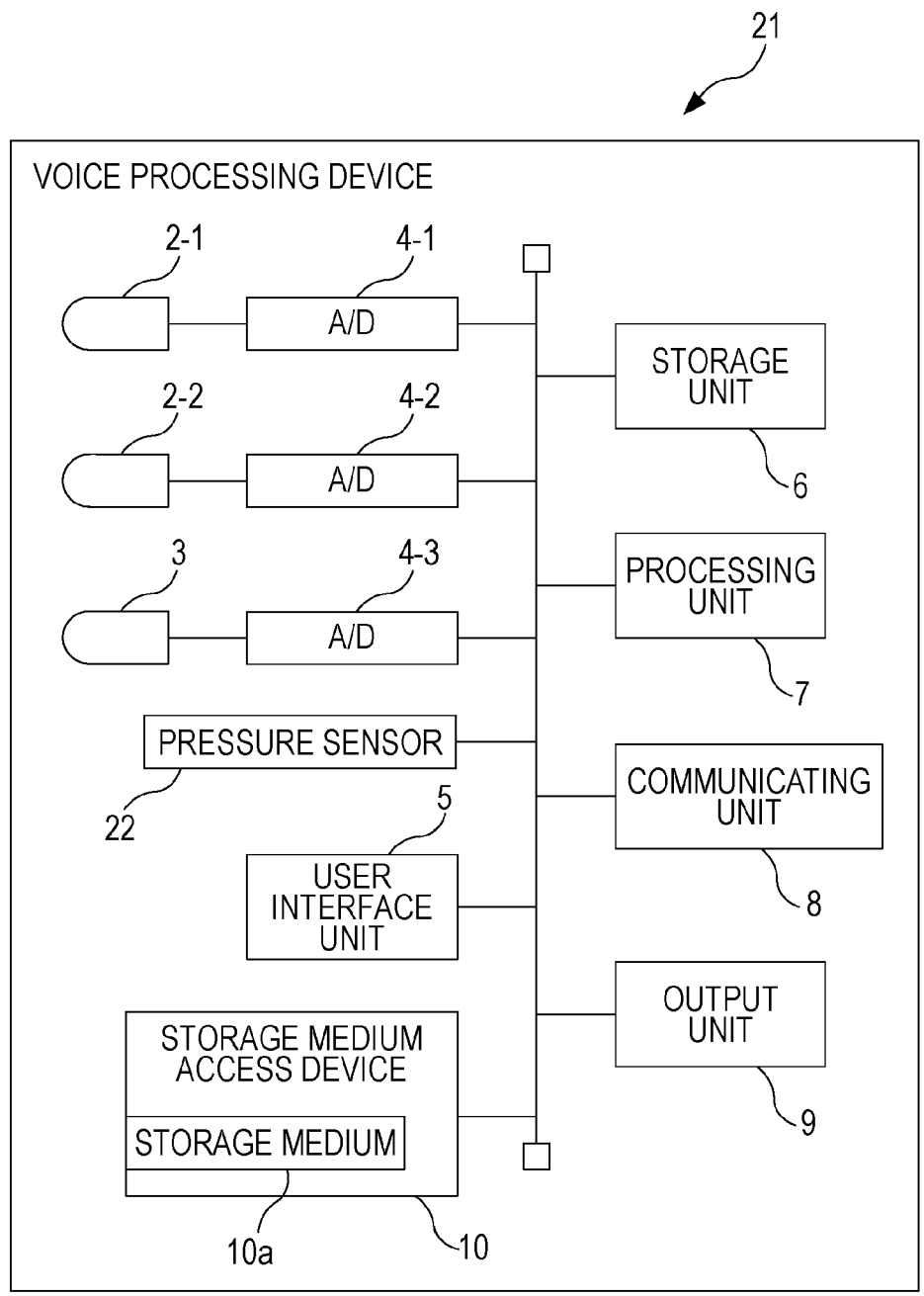
FIG. 8 is a schematic diagram of the structure of a voice processing device according to a second embodiment.

FIG. 8 is a schematic diagram of the structure of a voice processing device according to a second embodiment. A voice processing device 21 includes the sound collecting units 2-1 and 2-2, the human-body vibration obtaining unit 3, the analog/digital converting units 4-1 to 4-3, the user interface unit 5, the storage unit 6, the processing unit 7, the communicating unit 8, the output unit 9, the storage medium access device 10, and a pressure sensor 22. Compared with the voice processing device 1 according to the first embodiment, the voice processing device 21 according to the second embodiment is different in that the pressure sensor 22 is provided and the process in the target sound source distance calculating unit 11 of the processing unit 7 is different. Thus, in the following, the pressure sensor 22, the target sound source distance calculating unit 11, and their related portions are described. Regarding the other components of the voice processing device 21, refer to the description of the components corresponding to those of the voice processing device according to the first embodiment.

Figure 9:
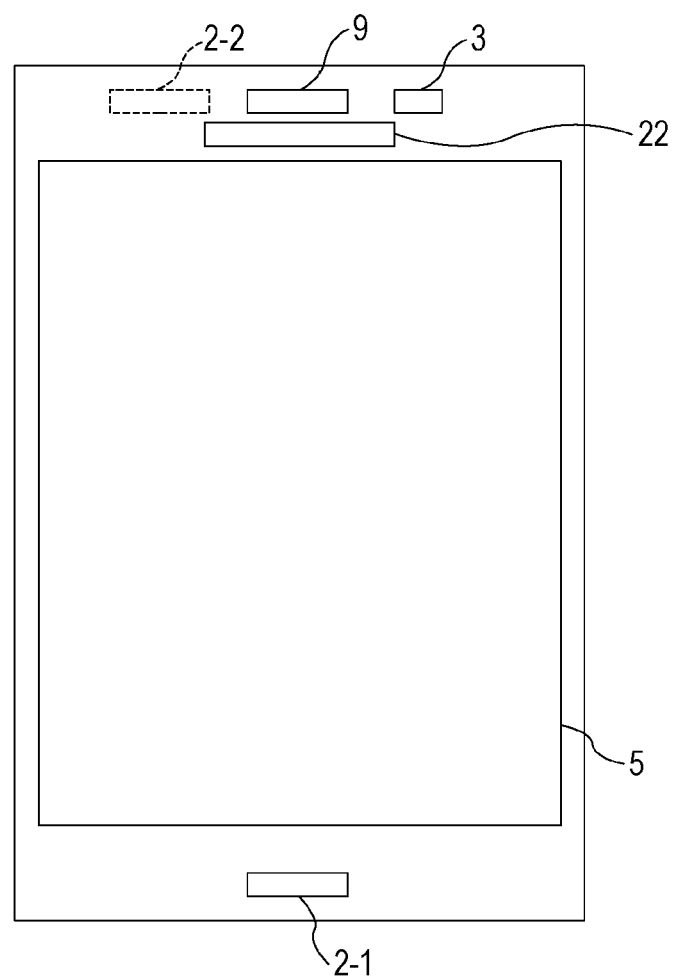
FIG. 9 is a diagram depicting an example of arrangement of a pressure sensor, sound collecting units, and a human-body vibration obtaining unit according to the second embodiment.

FIG. 9 is a diagram depicting an example of arrangement of the pressure sensor, the sound collecting units, and the human-body vibration obtaining unit according to the second embodiment. Also in this embodiment, the sound collecting unit 2-2 is disposed along a longitudinal direction of a housing of the voice processing device 21 on the back surface side near the end on the side where the output unit 9 which outputs voice is disposed, and the sound collecting unit 2-1 is disposed on the front surface side near the end opposite to the output unit 9.

Also, the human-body vibration obtaining unit 3 is mounted on the front surface side of the housing of the voice processing device 21 so as to be adjacent to the output unit 9. Furthermore, to detect a pressure by pressing from the ear of the user or its proximity at the time of conversation, the pressure sensor 22 is also mounted on the front surface side of the housing of the voice processing device 21 so as to be adjacent to the output unit 9.

The storage unit 6 stores, for each of a plurality of different pressure values, distance estimation information in associated with that pressure value. When voice processing is performed, the target sound source distance calculating unit 11 reads, from the storage unit 6, distance estimation information associated with a pressure value closest to the pressure value obtained from the pressure sensor 22. Then, with reference to the read distance estimation information, the target sound source distance calculating unit 11 calculates the distance from the sound collecting unit 2-1 to the user's mouth corresponding to the ratio of the power of the human-body vibration signal and the power of the first voice signal.

According to the present embodiment, the voice processing device uses appropriate distance estimation information in accordance with the pressure by pressing. Therefore, the distance from the sound collecting unit 2-1 to the user's mouth is more correctly estimated.

Also, according to a modification example, the voice processing device may estimate the distance from the sound collecting unit 2-1 to the sound source in accordance with another distance estimation method capable of estimating the distance to the sound source for each frequency. For example, the voice processing device may include three or more microphones disposed at different positions. In this case, for each of a plurality of sets each including two microphones selected from these three or more microphones, the voice processing device estimates a sound source direction for each frequency based on a voice signal from each microphone included in that set. The voice processing device then estimates, from the estimated value of the sound source direction for each set of microphones and a positional relation among these microphones, a distance to the sound source for each frequency based on the principles of triangulation.

Furthermore, according to another modification example, the voice processing device may correct both of the first and second voice signals. In this case, the signal correcting unit 16 corrects not only the first frequency signal but also the second frequency signal in accordance with equation (6). The frequency time converting unit 17 then converts each of the corrected first and second frequency signals to a time-domain signal.

According to still another modification example, the gain determining unit 15 may newly set a value obtained by adding 1 to the gain GL found in accordance with equation (5) as the gain GL. In this case, when the distance R(f) between the sound collecting unit 2-1 and the sound source is equal to or larger than (LE+ΔL), the component of the frequency f of the first frequency signal is not suppressed. Instead, when the distance R(f) is smaller than (LE+ΔL), the gain GL is determined so that the component of the frequency f of the first frequency signal is emphasized. Similarly, the gain determining unit 15 may newly set a value obtained by adding 1 to the gain Gθ found in accordance with equation (5) as the gain Gθ.

Still further, a computer program which causes a computer to achieve each function included in the processing unit of the voice processing device according to each of the above-described embodiments and modification examples may be provided in a form of being recorded on a medium readable by the computer, such as a magnetic recording medium or optical recording medium.

All examples and specific terms recited herein are intended for pedagogical purposes to aid the reader in understanding of the concepts contributed by the inventor to promote the disclosure and relevant technology, and are to be construed as being without limitation to such specifically recited examples and conditions, nor does the organization of such examples in the specification regarding the superiority and inferiority of the disclosure. While the embodiments have been described in detail, it is to be understood that various changes, substitutions, and alterations may be made to the embodiments without departing from the spirit and scope of the disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A voice processing device for noise suppression, the voice processing device comprising:
   a first microphone configured to collect a voice propagating through space and generate a first voice signal representing the voice;
   a second microphone disposed at a position different from the first microphone and configured to collect a voice propagating through space and generate a second voice signal representing the voice;
   a third microphone configured to obtain vibration propagating through a human body and generate a human-body vibration signal representing the vibration;
   memory configured to store distance estimation information representing a relation between a ratio in power or amplitude between the human-body vibration signal and the first voice signal and a distance from the first microphone to a sound source which produces the voice corresponding to the vibration; and
   one or more processors communicatively coupled to the memory and configured to cause performance of operations, the operations comprising:
      calculate, for each frame having a predetermined time length, the ratio in power or amplitude between the human-body vibration signal and the first voice signal and calculate a first distance from the first microphone to the sound source in accordance with the ratio and the distance estimation information;
      convert, for each frame, the first voice signal and the second voice signal to a first frequency signal and a second frequency signal, respectively, in a frequency domain;
      calculate, for each frame and for each of a plurality of frequencies, a second distance from the first microphone to a sound source which produces a component of the frequency of the first frequency signal, based on the first frequency signal and the second frequency signal;
      determine, for each frame and for each of the plurality of frequencies, a gain based on a comparison result between the first distance and the second distance;
      correct the first frequency signal by correcting, for each frame, a component of each of the plurality of frequencies of the first frequency signal in accordance with the gain of the corresponding frequency; and
      convert, for each frame, the corrected first frequency signal to a corrected voice signal in a time domain.

2. The voice processing device according to claim 1, wherein the operations further comprise
   find a rate of the power or amplitude of the first voice signal to the power of the human-body vibration signal as the ratio, and calculates the first distance so that the first distance is decreased as the ratio is increased.

3. The voice processing device according to claim 1, further comprising:
   a pressure sensor configured to detect a pressure by pressing, wherein
   the memory stores the distance estimation information for each of a plurality of different pressure values, and
   calculating the first distance by using the distance estimation information corresponding to a value of pressure detected by the pressure sensor among the plurality of pressure values.

4. The voice processing device according to claim 1, wherein the operations further comprise: estimate, for each frame and for each of the plurality of frequencies, a sound source direction of a component of the frequency of the first frequency signal in accordance with a phase difference between a component of the frequency of the first frequency signal and a component of the frequency of the second frequency signal, and calculate, for each of the plurality of frequencies, the second distance based on a power difference between the component of the frequency of the first frequency signal and the component of the frequency of the second frequency signal and the sound source direction.

5. The voice processing device according to claim 4, wherein the operations further comprise
   determine the gain for each of the plurality of frequencies so that a gain corresponding to the component of the first frequency signal for the frequency when the sound source direction for the frequency falls out of a predetermined range is smaller than the gain when the sound source direction for the frequency falls within the predetermined range.

6. A voice processing method for noise suppression, the method comprising:
   by a first microphone, collecting a voice propagating through space and generating a first voice signal representing the voice;
   by a second microphone disposed at a position different from the first microphone, collecting a voice propagating through space and generating a second voice signal representing the voice;
   by a third microphone, obtaining vibration propagating through a human body and generating a human-body vibration signal representing the vibration;
   calculating, for each frame having a predetermined time length, a ratio in power or amplitude between the human-body vibration signal and the first voice signal and, in accordance with distance estimation information representing a relation between the ratio in power or amplitude between the human-body vibration signal and the first voice signal and a distance from the first microphone to a sound source which produces a voice corresponding to the vibration, calculating a first distance from the first microphone to the sound source;

converting, for each frame, the first voice signal and the second voice signal to a first frequency signal and a second frequency signal, respectively, in a frequency domain;

calculating, for each frame and for each of a plurality of frequencies, a second distance from the first microphone to a sound source which produces a component of the frequency of the first frequency signal, based on the first frequency signal and the second frequency signal;

determining, for each frame and for each of the plurality of frequencies, a gain based on a comparison result between the first distance and the second distance;

correcting the first frequency signal by correcting, for each frame, a component of each of the plurality of frequencies of the first frequency signal in accordance with the gain of the corresponding frequency; and converting, for each frame, the corrected first frequency signal to a corrected voice signal in a time domain.

7. A non-transitory computer readable recording medium having therein a program for causing a computer to execute a process for noise suppression, the process comprising:

calculating, for each frame having a predetermined time length, a ratio in power or amplitude between a first voice signal generated by a first microphone collecting a voice propagating through space, the first voice signal representing the voice, and a human-body vibration signal generated by a third microphone obtaining vibration propagating through a human body, the human-body vibration signal representing the vibration and, in accordance with distance estimation information representing a relation between the ratio in power or amplitude between the human-body vibration signal and the first voice signal and a distance from the first microphone to a sound source which produces a voice corresponding to the vibration, calculating a first distance from the first microphone to the sound source;

converting, for each frame, the first voice signal and a second voice signal generated by a second microphone disposed at a position different from the first microphone collecting a voice propagating through space, the second voice signal representing the voice, to a first frequency signal and a second frequency signal, respectively, in a frequency domain;

calculating, for each frame and for each of a plurality of frequencies, a second distance from the first microphone to a sound source which produces a component of the frequency of the first frequency signal, based on the first frequency signal and the second frequency signal;

determining, for each frame and for each of the plurality of frequencies, a gain based on a comparison result between the first distance and the second distance;

correcting the first frequency signal by correcting, for each frame, a component of each of the plurality of frequencies of the first frequency signal in accordance with the gain of the corresponding frequency; and converting, for each frame, the corrected first frequency signal to a corrected voice signal in a time domain.

* * * * *